UNITED STATES PATENT OFFICE.

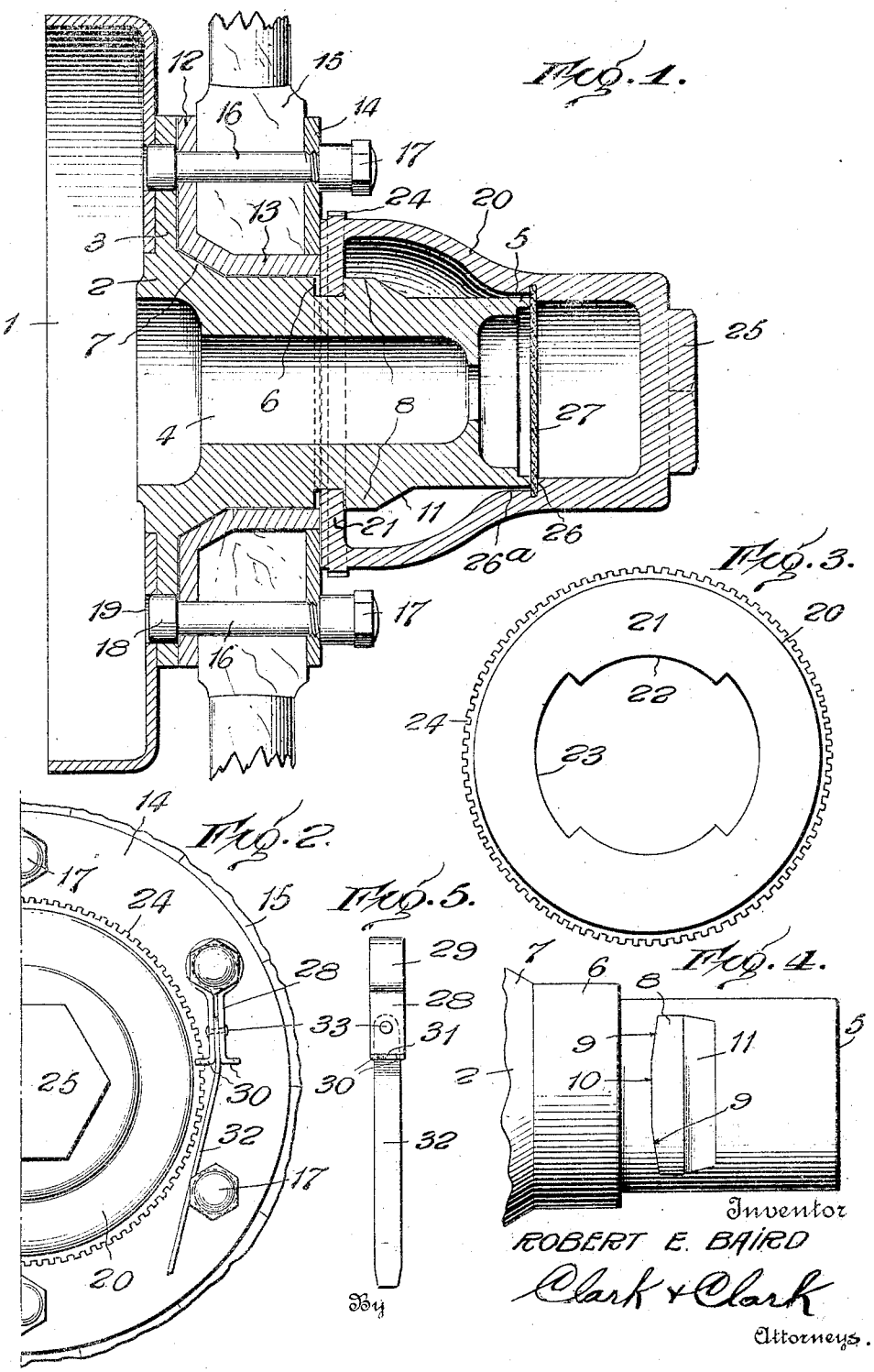

ROBERT E. BAIRD, OF SALT LAKE CITY, UTAH.

DEMOUNTABLE-HUB-ATTACHING DEVICE.

1,382,160.   Specification of Letters Patent.   Patented June 21, 1921.

Application filed March 1, 1919. Serial No. 280,013.

*To all whom it may concern:*

Be it known that I, ROBERT E. BAIRD, a citizen of the United States, residing at Salt Lake City, in the county of Salt Lake and State of Utah, have invented new and useful Improvements in Demountable-Hub-Attaching Devices, of which the following is a specification.

This invention relates to hub attaching devices, and more particularly to devices for securely attaching the demountable hubs commonly employed on motor vehicles.

Among the important objects of the invention are to provide a universal attaching device which may be employed with equal efficiency for wheels on either side of a vehicle, thus obviating the necessity of using "rights" and "lefts;" to provide a device of this character which shall be exceptionally "quick detachable," can be locked by turning through a small angle in either direction, and which, when so locked, has no tendency to work loose. A further object is to provide a hub attaching device in the nature of a cap, which shall be ornamental in appearance, and which shall form with the end of the inner hub a seal to prevent oil from the bearings from working out over the hub or wheel parts.

A subsidiary object of the invention is to provide effective means to prevent the accidental turning of the cap after it has been locked in position.

With the above and other objects in view, the invention consists in the construction and arrangement of parts hereinafter described and claimed and illustrated in the accompanying drawings, in which—

Figure 1 is a longitudinal central section through a pair of concentrically mounted inner and outer hubs, showing my improved hub attaching device as it appears when in operative position;

Fig. 2 is a fragmentary front elevation of the parts shown in Fig. 1;

Fig. 3 is a rear end elevation of my improved attaching or locking device;

Fig. 4 is a fragmentary plan view of the inner hub; and

Fig. 5 is a side elevation of an improved locking pawl for preventing the accidental displacement of the hub attaching device.

Referring to the drawings in detail, 1 designates the usual brake drum which is rigidly secured to the inner hub 2. This hub is provided adjacent its inner end with a radially extending annular flange 3 and is formed with a central bore 4 adapted to receive the vehicle axle. In the case of a front wheel the hub is mounted on the axle by means of suitable ball bearings (not shown) and in the case of a rear wheel the hub will be suitably keyed upon the end of the live axle, as is well known in the art.

The inner hub 2 is provided with an outer annular shoulder 6 and also preferably with an inner beveled portion 7 adjacent the flange 3, the detachable hub being received substantially in the space between the shoulder 6 and flange 3. Spaced outwardly from the shoulder 6, the hub 2 carries a plurality of locking lugs 8, preferably formed integral therewith, two of such lugs being shown in the drawings. Each of these lugs has its inner face substantially perpendicular to the surface of the hub. The end portions of such inner face are beveled or oppositely inclined as indicated at 9, so that they lie in planes disposed at an obtuse angle to the axis of the hub and to each other, while the central portion 10 of such face lies in a plane at right angles to the axis of the hub. The outer face 11 of each of the lugs 8 is preferably beveled, as shown.

The outer or demountable hub comprises an inner plate 12 having a cylindrical portion 13 constituting a lining or box, and an outer annular plate 14, and between the plates 12 and 14 the spokes 15 are set, such spokes abutting against the lining or box 13 at their inner ends. The plates 12 and 14 are secured together by means of a plurality of bolts 16 having nuts 17 bearing against the plate 14. The heads 18 of said bolts are preferably round and serve as studs which enter corresponding openings 19 in the flange 3 and brake drum 1, thus forming the driving connection between the inner and outer hubs. My improved hub attaching device is designated in its entirety by the reference numeral 20 and comprises a bell-shaped cap or casing preferably formed of cast metal. Around the inner or enlarged end of the cap extends an inwardly projecting angular flange 21, the edge of which is cut away so as to form alternating lugs 22 and notches 23. The notches 23 are complementary to the lugs 8 and are adapted to slip over the same, while the lugs 22 are constructed to engage behind and interlock with the lugs 8.

The inner surface of the flange 21 forms a flat face which is adapted to abut against the edge of the box or lining 13 of the demountable hub and form a tight joint, thus excluding dirt and dust from the interior of the cap. In this connection it will be noted that the lining 13 of the outer hub extends slightly beyond the shoulder 6 on the inner hub so as to engage the flange 21 of the attaching device and seat snugly thereagainst.

Around the periphery of the inner edge of the locking device 20 is a series of teeth or serrations 24 having square shoulders as clearly shown in Figs. 2 and 3, for a purpose hereinafter described. The outer end of the casing 20 is extended beyond the hub to form a cap and is preferably provided at its outer end with a hexagonal or other nut 25.

An annular internal shoulder 26 is formed in the cap and this is adapted to coöperate with the end 5 of the inner hub to form therewith, by means of an interposed washer 27, of yielding material a fluid tight joint. This is for the purpose of preventing oil from the bearing from working its way outwardly around the outside of the inner hub and over the cap and outer hub. It will be understood that the washer 27 is of sufficient thickness and compressibility to permit snug engagement of the parts 13 and 21.

It will be noted that adjacent the shoulder 26 is formed a bore 26ª which closely embraces the end 5 of the inner hub. This is for the purpose of relieving the locking lugs 22 of strain in case the hub attaching device 20 receives a lateral blow or impact as might result from striking an obstruction.

In order to prevent the accidental angular displacement or turning of the attaching device 20, I provide a locking pawl adapted to engage the teeth 24. This pawl comprises a member 28 having a loop 29 adapted to encircle one of the nuts 17, such nut having a cylindrical portion for this purpose. The ends of the member 28 are turned outwardly substantially at right angles to form wings 30, which it will be noted, extend in a substantial radial direction relative to the attaching device 20. Each of these wings has its central portion cut away at 31 so as to form a notch adapted to embrace the teeth 24 and thus prevent lateral displacement. A resilient tail piece 32 as pivoted at 33 between the ends of the member 28, and in use, this resilient tail piece is adapted to engage behind one of the nuts 17 as clearly shown in Fig. 2 so as to hold one of the wings 30 in engagement with the teeth or serrations 24.

It has heretofore been proposed to employ a locking pawl of this general nature, but in such former devices the wings 30 instead of being disposed radially, as above described, were bent so as to extend at an acute angle to the radius of the attaching device. The idea was that in use, the locking pawl would be swung to one side or the other of its pivot in accordance with the direction in which the attaching device would tend to turn. If this direction was properly determined by the operator and the locking pawl correctly positioned, the former device above referred to would operate effectively. It was found in practice, however, that frequently through carelessness or ignorance, the pawl would be placed upon the wrong side of its pivot, with the result that the locking device was not prevented from turning in the direction in which it tended to turn.

With my improved device, however, it will be noted that the attaching device or cap 20 will be securely held against rotation in either direction with the locking pawl in either one of its positions, due to the engagement of the radial wings with the squared shoulder serrations, and the result of this is that it is impossible to place the pawl incorrectly or in an ineffective position.

The method of assembling a wheel by means of my improved hub attaching device will be apparent from the above description of the structural features. After the outer hub has been placed in position the attaching device 20 is moved axially inwardly until the flange 21 abuts against the outer edge of the lining 13, the lugs 8, during such axial movement, passing through the notches 23 in the flange 21. After the attaching device 20 has been brought up against the lining 13 of the outer hub, it is given a slight angular movement or rotation in either direction. This causes the lugs 22 to ride upwardly along the inclined surfaces 9 of the lugs 8 and finally engage behind the flat surfaces 10 thereof. The attaching device is then locked in position by means of the pawl above described.

It will be noted that my improved attaching device can be moved into locking position by rotation in either direction. Therefore, it is immaterial on which side of the vehicle the attaching device is employed, or, in other words, the same attaching device can be used indiscriminately on either side. It will be further noted that when the lugs 22 are seated behind the central portion 10 of the locking face of the lugs 8, there is no tendency, as in the case of a screw, to rotate in either direction and become loose. This is due to the fact that the engaging surfaces of the lugs are at right angles to the axis of the hub and therefore at right angles to the thrust.

From the above it will be seen that I have provided an extremely simple and effective attaching or locking device for demountable hubs so constructed that it is impossible to apply the device in an improper manner, and it is thought that the many advantages of my invention will be readily appreciated by those skilled in such matters, without further discussion.

What I claim is:—

1. The combination with an inner hub, of means for attaching an outer hub thereto, said means comprising lugs carried by said inner hub, and an elongated hollow, bell-shaped hub-cap or locking member located with its enlarged inner end inclosing said inner hub but spaced from the sides thereof, and a radially disposed inwardly extending locking flange carried at the extreme inner edge of said hub cap and constructed to engage between the outer hub and said lugs.

2. The combination with an inner hub, of means for attaching an outer hub thereto, said means comprising lugs carried by said inner hub, and a hollow locking member inclosing said inner hub and having means adapted to engage with said lugs, said member having means for forming with the end of said inner hub a liquid tight seal.

3. The combination with an inner hub, of a concentric locking member for attaching an outer hub thereto, and capable of rotation thereon in both directions, said inner hub and locking member having complementary sets of alternating lugs and notches, whereby said parts may be assembled axially when in one angular position, and caused to interlock when shifted to another angular position, the working face of each lug of one of said sets comprising a pair of symmetrically disposed, oppositely inclined surfaces, whereby, when said locking member is turned in either direction from the assembling position, one of said inclined surfaces will engage a lug of the other set with a wedging action.

4. The combination with an inner hub of a locking member for attaching an outer hub thereto, said inner hub and locking member having complementary sets of alternating lugs and notches, whereby said parts may be assembled axially when in one angular position, and when turned to another angular position said sets of lugs will be caused to interlock, the interengaging surfaces of one of said sets of lugs lying partly in planes at right angles to the axis, and partly in planes inclined thereto.

5. A hub member having lugs, and a locking member having a complementary set of lugs adapted to interlock therewith, the interengaging surface of each lug of one set comprising a flat central portion lying in a plane at right angles to the axis of the hub, and a pair of end portions lying in planes inclined to such axis and to each other, whereby relative rotation of the members in either direction causes one set of lugs to ride up the inclined surfaces of the other set, and finally rest upon the flat central surfaces thereof.

6. The combination with a fastening cap or the like adapted to be locked or released by an angular turning movement in either direction, of means for preventing accidental rotation of such cap, said means comprising an annular series of square shouldered serrations carried by said cap, and a pawl mounted to swing in the plane of said serrations and adapted to engage the same, the engaging portion of said pawl extending substantially radially to the axis of the cap, and means for resiliently urging said pawl toward said cap, whereby it is caused to enter said square shouldered serrations and thus hold the cap against rotation in either direction.

7. The combination with a fastening cap or the like adapted to be locked by an angular turning movement, of means for preventing accidental rotation of such cap, said means comprising a series of square shouldered serrations carried by said cap, and a swinging pawl having a pair of wings adapted to engage said serrations, and a pin on which said pawl is pivoted and about which it can swing to either one of two operative positions, said wings projecting substantially radially to the axis of the hub, whereby said pawl serves to hold the cap against rotation in either direction, when swung to either operative position.

In testimony whereof I affix my signature in presence of two witnesses.

ROBERT E. BAIRD.

Witnesses:
JOHN M. DENNE,
ELIZABETH M. SITTER.